US010767020B2

(12) United States Patent
Dahlén et al.

(10) Patent No.: US 10,767,020 B2
(45) Date of Patent: Sep. 8, 2020

(54) CATALYST MASTERBATCH

(71) Applicant: BOREALIS AG, Vienna (AT)

(72) Inventors: Kristian Dahlén, Stora Hoga (SE); Perry Nylander, Gothenburg (SE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/388,740

(22) PCT Filed: Apr. 24, 2013

(86) PCT No.: PCT/EP2013/001235
§ 371 (c)(1),
(2) Date: Sep. 26, 2014

(87) PCT Pub. No.: WO2013/159924
PCT Pub. Date: Oct. 31, 2013

(65) Prior Publication Data
US 2015/0065653 A1 Mar. 5, 2015

(30) Foreign Application Priority Data
Apr. 27, 2012 (EP) ................................. 12002995

(51) Int. Cl.
| | | |
|---|---|---|
| *C08J 3/24* | (2006.01) | |
| *H01B 3/44* | (2006.01) | |
| *C08L 43/04* | (2006.01) | |
| *C08J 3/22* | (2006.01) | |
| *C08K 5/09* | (2006.01) | |
| *C08L 23/08* | (2006.01) | |
| *C08K 5/42* | (2006.01) | |
| *C08L 51/06* | (2006.01) | |

(52) U.S. Cl.
CPC ............... *C08J 3/24* (2013.01); *C08J 3/226* (2013.01); *C08K 5/09* (2013.01); *C08L 23/0869* (2013.01); *C08L 43/04* (2013.01); *H01B 3/44* (2013.01); *C08J 2323/08* (2013.01); *C08J 2343/04* (2013.01); *C08J 2451/06* (2013.01); *C08K 5/42* (2013.01); *C08L 51/06* (2013.01); *C08L 2203/202* (2013.01); *C08L 2310/00* (2013.01); *C08L 2312/08* (2013.01)

(58) Field of Classification Search
CPC . C08J 2451/06; C08J 3/24; C08J 3/226; C08J 3/22; C08J 2323/08; C08J 2343/04; C08L 51/06; C08L 43/04; C08L 2203/202; C08L 2310/00; C08L 2312/08; C08L 23/0869; H01B 3/44; C08K 5/09; C08K 5/24
USPC .......................................................... 525/72
See application file for complete search history.

(56) References Cited

U.S. PATENT DOCUMENTS

| | | | |
|---|---|---|---|
| 3,236,917 A | 2/1966 | Natta et al. | |
| 3,646,155 A | 2/1972 | Scott | |
| 3,723,397 A | 3/1973 | Hoh et al. | |
| 4,117,195 A | 9/1978 | Swarbrick et al. | |
| 4,639,495 A | 1/1987 | Waggoner | |
| 4,950,541 A | 8/1990 | Tabor et al. | |
| 5,194,509 A | 3/1993 | Hasenbein et al. | |
| 6,441,097 B1 * | 8/2002 | Blank .................... C08F 8/42 | |
| | | | 525/244 |
| 2013/0161064 A1 * | 6/2013 | Shimada ............... H01B 3/441 | |
| | | | 174/113 R |

FOREIGN PATENT DOCUMENTS

| | | | | |
|---|---|---|---|---|
| EP | 736065 B1 | 9/2000 | | |
| EP | 1443069 A1 | 8/2004 | | |
| EP | 1849816 A1 | 10/2007 | | |
| EP | 1923404 A1 | 5/2008 | | |
| EP | 2072571 A1 * | 6/2009 | ............... | C08K 5/13 |
| WO | WO 9109075 A1 * | 6/1991 | ............... | C08F 8/12 |
| WO | 0036612 A1 | 6/2000 | | |

OTHER PUBLICATIONS

International Preliminary Report on Patentability of International Application No. PCT/EP2013/001235 dated Oct. 28, 2014.
International Search Report of International Application No. PCT/EP2013/001235 dated Apr. 27, 2012.
Haslam et al., "Identification and Analysis of Plastics", London Iliffe Books, 2nd Edition, 1972, pp. 278-332.

* cited by examiner

*Primary Examiner* — Josephine L Chang
(74) *Attorney, Agent, or Firm* — Insigne LLP

(57) ABSTRACT

The present invention relates to a catalyst masterbatch for cross-linking a polyolefin having cross-linkable silicon-containing groups. The catalyst masterbatch includes both of a Brønsted acid and/or Brønsted acid anhydride (A); and a polyolefin (B) containing Brønsted acid and/or Brønsted acid anhydride groups. The invention also encompasses compositions of a polyolefin having cross-linkable silicon-containing groups that include the catalyst masterbatch, use of the catalyst masterbatch in a cross-linking reaction of silicon-containing polyolefins, and a cable layer that includes a polymer made using the catalyst masterbatch.

11 Claims, No Drawings

CATALYST MASTERBATCH

The cross-linking of polyolefins comprising cross-linkable silicon-containing groups with catalysts is well-known in the art. It is inter alia described in EP 736 065. Usually suitable catalysts are added as so-called masterbatches, i.e. are compounded with a polymer ("carrier"). The masterbatch is then added to the polymer to be cross-linked. Thereby handling of the catalyst is facilitated.

Polyolefins comprising cross-linkable silicon-containing groups are suitable for several applications, particularly wire and cable applications and pipes.

It has been observed that in case the polymer to be cross-linked contains pigments the cross-linking efficiency is lowered, i.e. the obtained cross-linking degree is lower or a longer cross-linking time is required.

Of course it is possible to simply add more silanol condensation catalyst. However, this may be undesirable from a cost perspective. Furthermore, adding a higher amount of catalyst may cause exudation of the catalyst resulting in a loss of catalyst and it might also result in sticky pellets which can have an impact in the flowability. Furthermore, the catalyst is a corrosive substance. Hence, a possible exudation may also be a safety and health concern requiring protective clothing and/or equipment resistant to the acid leading to higher costs. There can also be a problem with high amount of acid that the system is overloaded and there will be a problem to add more additives, e.g. antioxidants, in the desired amount.

It has been surprisingly found that by using a polyolefin containing Brønsted acid and/or Brønsted acid anhydride groups in the catalyst masterbatch an improved cross-linking performance can be obtained.

Therefore the present invention provides a catalyst masterbatch for cross-linking a polyolefin comprising cross-linkable silicon-containing groups comprising
- a Brønsted acid and/or Brønsted acid anhydride (A); and
- a polyolefin (B) containing Brønsted acid and/or Brønsted acid anhydride groups.

With the above masterbatch the cross-linking efficiency is improved while simultaneously exudation of the Brønsted acid and/or sulphonic acid anhydride is avoided or at least significantly reduced.

In the present invention "polyolefin (B) containing Brønsted acid and/or Brønsted acid anhydride groups" denotes that Brønsted acid and/or Brønsted acid anhydride groups are covalently bound. The Brønsted acid and/or Brønsted acid anhydride groups may be introduced into the polymer by copolymerisation or by grafting.

The amount of Brønsted acid and/or Brønsted acid anhydride (A) in the catalyst masterbatch is preferably 20.0 wt. % or less based on the total weight of the catalyst masterbatch, more preferably 15.0 wt. % or less based on the total weight of the catalyst masterbatch and most preferably 10.0 wt. % or less based on the total weight of the catalyst masterbatch.

Usually the amount of Brønsted acid and/or Brønsted acid anhydride (A) in the catalyst masterbatch is at least 0.5 wt. % based on the total weight of the catalyst masterbatch, preferably at least 1.0 wt. % based on the total weight of the catalyst masterbatch.

Preferably the amount of component (B) in the catalyst masterbatch is at least 5 wt. % based on the total weight of the masterbatch, more preferably at least 15 wt. % based on the total weight of the masterbatch and most preferably at least 20 wt. % based on the total weight of the masterbatch.

The amount of component (B) in the catalyst masterbatch is preferably not more than 99 wt. % based on the total weight of the masterbatch, more preferably not more than 97 wt. % based on the total weight of the masterbatch and most preferably not more than 95 wt. % based on the total weight of the masterbatch.

Preferably, component (B) is an ethylene polymer or propylene polymer.

Preferably, the sum of the weights of Brønsted acid groups and Brønsted acid anhydride groups in component (B) is at least 0.01 wt. %, more preferably at least 0.03 wt. % and most preferably at least 0.05 wt. % based on the weight of component (B).

The weight of Brønsted acid groups and Brønsted acid anhydride groups in component (B) or the masterbatch refer to the respective groups as such, e.g. in case of carboxylic acids to the weight of the —COOH-groups, in case of carboxylic acid anhydrides to the weight of the and —C(=O)—O—C(=O)— groups, in case of sulphonic acids to the weight of —S(O)$_2$OH— groups, in case of sulphonic acid anhydrides to the weight of —S(O)$_2$—O—(O)$_2$S— groups.

Preferably, the sum of the weights of Brønsted acid and Brønsted acid anhydride groups in component (B) is not more than 30 wt. %, more preferably of not more than 10.0 wt. % and most preferably of not more than 5.0 wt. % based on the weight of component (B).

Preferably, the sum of the weights of Brønsted acid and Brønsted acid anhydride groups in the catalyst masterbatch is at least 0.2 wt. %, more preferably at least 0.5 wt. % and most preferably at least 1.0 wt. % based on the total weight of catalyst masterbatch.

Preferably, the sum of the weights of Brønsted acid and Brønsted acid anhydride groups in the catalyst masterbatch is not more than 40 wt. %, more preferably of not more than 25 wt. % and most preferably of not more than 15 wt. % based on the total weight of catalyst masterbatch.

As already outlined above, the Brønsted acid and/or Brønsted acid anhydride groups may be introduced into the polymer by copolymerisation or by grafting.

In the following preferred features in case the Brønsted acid and/or Brønsted acid anhydride groups are introduced into the polymer by grafting are described.

As grafting agent, any such agent can be used which is known to be suitable for this purpose by the person skilled in the art.

Preferably, the grafting agent is an unsaturated carboxylic acid or a derivative thereof such as an anhydride, an ester and a salt (both metallic or non-metallic). Usually the grafting agent does not contain more than 20 carbon atoms.

Preferably, the unsaturated group is in conjugation with the carboxylic group. Hence, preferably, the grafting agent contains the structural element C=C—COO.

Examples of suitable grafting agents are acrylic acid, methacrylic acid, fumaric acid, maleic acid, nadic acid, citraconic acid, itaconic acid, crotonic acid, and their anhydrides, metal salts, esters amides or imides whereby maleic acid its derivatives such as maleic anhydride are preferred, and maleic anhydride is particularly preferred.

Grafting can be carried out by any process known in the art such as grafting in an melt without a solvent or in solution or dispersion or in a fluidised bed. Preferably, grafting is performed in a heated extruder or mixer as e.g. described in U.S. Pat. Nos. 3,236,917, 4,639,495, 4,950,541 or 5,194,509. The content of these documents is herein included by reference. Preferably, grafting is carried out in a twin screw extruder such as described in U.S. Pat. No. 4,950,541.

Grafting may be carried out in the presence or absence of a radical initiator but is preferably carried out in the presence of a radical initiator such as an organic peroxide, organic perester or organic hydroperoxide.

The amount of said grafting agent added to the polymer before grafting is preferably from 0.01 to 3.0 weight %, more preferably from 0.03 to 1.5 weight % of the polymer the grafting agent is applied on.

The carboxylic acid groups and/or carboxylic acid anhydride groups may alternatively be introduced into the polymer by copolymerisation. This is inter alia described in U.S. Pat. No. 3,723,397.

Generally the same compounds used for grafting may also be used for copolymerisation.

Preferably, the comonomer used for copolymerisation is an unsaturated carboxylic acid or a derivative thereof such as an anhydride, an ester and a salt (both metallic or non-metallic). Usually the comonomer does not contain more than 20 carbon atoms.

Preferably, the unsaturated group is in conjugation with the carboxylic group. Hence, preferably, the comonomer contains the structural element C=C—COO.

Examples of suitable comonomers include acrylic acid, methacrylic acid, fumaric acid, maleic acid, nadic acid, citraconic acid, itaconic acid, crotonic acid, and their anhydrides, metal salts, esters amides or imides whereby maleic acid its derivatives such as maleic anhydride are preferred, and maleic anhydride is particularly preferred.

In case the carboxylic acid groups and/or carboxylic acid anhydride groups are introduced into the polymer by grafting or by copolymerisation the carboxylic acid groups and/or carboxylic acid anhydride groups are present in at least one of the polymers present in the carrier, preferably, they are present in at least one of the polyolefins present in the carrier.

The Brønsted acid and/or Brønsted acid anhydride groups in component (B) are preferably selected from a group consisting of ethylenically unsaturated carboxylic acids, ethylenically and unsaturated carboxylic acid.

Examples of suitable ethylenically unsaturated carboxylic acids and anhydrides include maleic acid, fumaric acid, acrylic acid, methacrylic acid, crotonic acid, isocrotonic acid, vinylacetic acid, oleic acid, elaidic acid, linoleic acid, linolenic acid, aconitic acid, itaconic acid, and norbonenedicarboxylic acid, and anhydrides.

It is especially preferred that the monomers in component (B) comprise, most preferably consist of maleic anhydride.

In a preferred embodiment component (B) is a anhydride modified ethylene homo- or copolymer or propylene homo- or copolymer, most preferably a maleic anhydride modified ethylene homo- or copolymer.

It is preferred that the compound containing Brønsted acid and/or Brønsted acid anhydride groups is grafted on the ethylene homo- or copolymer or propylene homo- or copolymer backbone. The procedures therefor are well known in the art.

The density of component (B) preferably is from 880 kg/m³ to 970 kg/m³, more preferably from 890 kg/m³ to 955 kg/m³, most preferably from 895 kg/m³ to 945 kg/m³.

It is preferred that component (B) has a melt flow rate (MFR) at 190° C. and a load of 2.16 kg of at least 100 g/10 min, more preferably of at least 200 g/10 min, still more preferably of at least 300 g/10 min, and most preferably of at least 400 g/10 min. The upper limit for the melt flow (MFR) at 190° C. and a load of 2.16 kg of component (B) usually is 1000 g/10 min.

The Brønsted acid and/or Brønsted acid anhydride (A) are not part of a polymer. Hence, they are not covalently bound to a polymer.

Preferably, the Brønsted acid and/or Brønsted acid anhydride (A) have a molecular weight of below 1500 g/mol.

The Brønsted acid and/or Brønsted acid anhydride (A) may be selected from carboxylic acids, carboxylic acid anhydride, sulphonic acid and/or sulphonic acid anhydrides.

Unless otherwise mentioned to the contrary, in the following preferred features of component (A) are described.

Preferably the carboxylic acid contains the following structural element (I)

$$HOOC—R^1 \qquad (I)$$

wherein $R_1$ is a $C_5$ to $C_{100}$ hydrocarbyl group, optionally containing heteroatoms, preferably $R^1$ is a $C_6$ to $C_{25}$ hydrocarbyl group, optionally containing heteroatoms.

In $R^1$ the heteroatoms may be oxygen and may be present in the form of further —COOH-groups. Hence, the carboxylic acid may comprise more than one —COOH-groups. Usually the carboxylic acid does not comprise more than five —COOH-groups, preferably not more than three —COOH-groups and most preferably not more than one —COOH-group. In the latter case $R^1$ does not comprise any —COOH-groups.

In case heteroatoms are present in $R^1$ the heteroatoms are preferably selected from N, S, P and O, more preferably are selected from N and O, even more preferably are O and most preferably the heteroatoms are O and only present in the form of one or more —COOH-group(s).

In case heteroatoms are present in $R^1$ usually not more than ten heteroatoms are present in $R^1$, preferably, not more than five heteroatoms are present in $R^1$ and most preferably not more than two heteroatoms are present in $R^1$.

However, preferably $R^1$ does not contain any heteroatoms.

Furthermore, the carboxylic acid is preferably free of aromatic structures.

The carboxylic acid anhydride is preferably an anhydride of one or more of the above carboxylic acids including the preferred embodiments thereof. Thus, the residues present on the carboxylic acid anhydride group may be identical or different, preferably are identical. In case of multifunctional carboxylic acids, the corresponding anhydride may be a cyclic anhydride, i.e. the residues present on the carboxylic acid anhydride group originate from the same molecule.

Preferably the sulphonic acid is an aromatic organic sulphonic acid comprising the structural element (II)

$$Ar(SO_3H)_x \qquad (II)$$

with Ar being an aryl group which may be substituted or non-substituted, and x being at least 1, even more preferably, the sulphonic acid is selected from the following compounds (i) an alkylated naphthalene monosulfonic acid substituted with 1 to 4 alkyl groups wherein each alkyl group is a linear or branched alkyl with 5 to 40 carbon atoms with each alkyl group being the same or different and wherein the total number of carbon atoms in the alkyl groups is in the range of 20 to 80 carbon atoms;

(ii) an arylalkyl sulfonic acid wherein the aryl group is phenyl or naphthyl and is substituted with 1 to 4 alkyl groups wherein each alkyl group is a linear or branched alkyl with 5 to 40 carbon atoms with each alkyl group being the same or different and wherein the total number of carbon atoms in the alkyl groups is in the range of 10 to 80;

an alkylated aryl disulfonic acid selected from the group consisting of the structure (III):

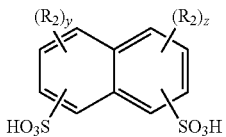

(III)

or the structure (IV):

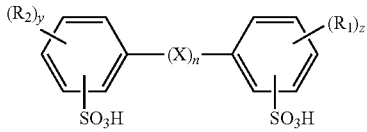

(IV)

wherein each of $R^1$ and $R^2$ are the same or different and is a linear or branched alkyl group with 6 to 16 carbon atoms, y is 0 to 3, z is 0 to 3 with the proviso that y+z is 1 to 4, n is 0 to 3, X is a divalent moiety selected from the group consisting of —$C(R^3)(R^4)$—, wherein each of $R^3$ and $R^4$ is H or independently a linear or branched alkyl group of 1 to 4 carbon atoms and n is 1; —C(=O)—, wherein n is 1; —S—, wherein n is 1 to 3 and —$S(O)_2$—, wherein n is 1.

Even more preferably, the sulphonic acid is selected from compounds of group (ii) and most preferably, in the sulphonic acid of group (ii) the aryl group is phenyl and is substituted with 1 to 2 alkyl groups wherein each alkyl group is a linear or branched alkyl with 8 to 25 carbon atoms with each alkyl group being the same or different and wherein the total number of carbon atoms in the alkyl groups is in the range of 12 to 40.

The sulphonic acid anhydride is preferably an anhydride of one or more of the above sulphonic acids including the preferred embodiments thereof. Thus, the residues present on the sulphonic acid anhydride group may be identical or different, preferably are identical. In case of multifunctional sulphonic acids, the corresponding anhydride may be a cyclic anhydride, i.e. the residues present on the sulphonic acid anhydride group originate from the same molecule.

Preferably the Brønsted acid and/or Brønsted acid anhydride (A) is selected from carboxylic acids, carboxylic acid anhydride, sulphonic acid and/or sulphonic acid anhydrides, more preferably from sulphonic acids and/or a carboxylic acids, even more preferably from sulphonic acids.

As already outlined above, the Brønsted acid and/or Brønsted acid anhydride (A) may be selected from a sulphonic acid anhydride or a carboxylic acid anhydride. However, preferably, the Brønsted acid and/or Brønsted acid anhydride (A) is free of sulphonic acid anhydrides or carboxylic acid anhydrides. Hence, in case sulphonic acid anhydrides and/or carboxylic acid anhydrides are present, they are preferably only present in component (B).

Unless otherwise explicitly mentioned to the contrary, in the following preferred features of all embodiments of the invention are described.

In the present invention a "Lewis acid" denotes a molecular entity (and the corresponding chemical species) that is an electron-pair acceptor and therefore able to react with a Lewis base to form a Lewis adduct, by sharing the electron pair furnished by the Lewis base.

In the present invention a "Brønsted acid" denotes a molecular entity capable of donating a hydron (proton) to a base, (i.e. a 'hydron donor') or the corresponding chemical species.

Preferably, the masterbatch according to the invention does not contain any acids besides Brønsted acids.

Thus, preferably the catalyst masterbatch is free of compounds which are Lewis acids but not Brønsted acids.

The catalyst masterbatch may further comprise:
silica and/or filler.

If present, the sum of silica and filler is preferably present in an amount of at least 0.5 wt. % based on the masterbatch, more preferably in an amount of at least 1.0 wt. % of the total weight of the masterbatch.

The filler can be of any type of talc, mica, montmorillonite, wollastonite, bentonite, silica, halloysite, kaolinite and other phyllosilicates.

Preferably, the catalyst masterbatch comprises silica and more preferably, the catalyst masterbatch comprises silica but does not comprise a filler.

Preferably, the silica has a particle size below 20 micrometer and a specific surface area of more than 1 $m^2/g$ and less than 600 $m^2/g$ (BET).

If present, the sum of silica and filler is preferably not more than 20.0 wt. % based on the masterbatch, more preferably not more than 10.0 wt. % of the total weight of the masterbatch and most preferably 5 wt % of the total weight of master batch.

The present invention further provides a polyolefin composition comprising
a polyolefin (C) comprising cross-linkable silicon-containing groups;
a Brønsted acid and/or Brønsted acid anhydride (A); and
a polyolefin (B) containing Brønsted acid and/or Brønsted acid anhydride groups.

(A) and (B) may be selected from any of the above embodiments of the present invention.

Preferably, (A) and (B) are part of the masterbatch according to the present invention.

The polyolefin composition is preferably further comprising
a pigment.

If present, the pigment is preferably present in an amount of at least 0.2 wt. % based on the polyolefin composition, preferably at least 0.5 wt. % based on the polyolefin composition.

If present, the pigment is preferably present in an amount of not more than 3.0 wt. % based on the polyolefin composition, preferably not more than 2.0 wt. % based on the polyolefin composition.

Most pigments contain a dye responsible for the colour and an agent to make the pigmented composition more opaque, in the following denoted "opaque agent". The dye usually selectively reflects and absorbs certain wavelengths of visible light, i.e. within the range of 380 nanometers to 780 nm.

The opaque agent is usually selected from $TiO_2$ and/or $CaCO_3$, most preferred $TiO_2$. $TiO_2$ is also used to give the pigment brightness. $CaCO_3$ is often used in mixtures with titanium dioxide pigment much for cost reduction.

In case the polymer composition should be more opaque only, it is possible to use an opaque agent as pigment. Hence, the pigment preferably comprises or consists of an opaque agent.

In a preferred embodiment the pigment consists of the opaque agent. Preferably, the opaque agent is selected from titanium dioxide and/or $CaCO_3$ and most preferred the opaque agent is titanium dioxide.

The composition of the present invention comprises a polyolefin, e.g. polyethylene, having cross-linkable silicon-containing groups (C).

The cross-linkable silicon-containing groups may be introduced into the polyolefin by copolymerisation of olefin, e.g. ethylene, monomers with comonomers having a silicon-containing group or by grafting, i.e. by chemical modification of the polymer by addition of a compound having a silicon-containing group mostly in a radical reaction. Both techniques are well known in the art.

The cross-linkable silicon-containing groups are preferably hydrolysable silane containing groups.

Preferably, the polyolefin having cross-linkable silicon-containing groups is obtained by copolymerisation. The copolymerisation is preferably carried out with a comonomer having silicon-containing groups, the comonomer being represented by the formula $$R^1SiR^2_qY_{3-q}$$

wherein
$R^1$ is an ethylenically unsaturated hydrocarbyl, hydrocarbyloxy or (meth)acryloxy hydrocarbyl group, preferably an ethylenically unsaturated hydrocarbyl group, more preferably an vinyl group
$R^2$ is a hydrocarbyl group, preferably a $C_1$ to $C_{20}$ hydrocarbyl group, more preferably a $C_1$ to $C_{10}$ hydrocarbyl group;
Y which may be the same or different, is a hydrolysable organic group, such as $R^3$—O—, $R^3$—(COO)—, $(R^3)_xH_{2-x}N$— whereby x=1 or 2 and $R^3$ is a $C_1$ to $C_{20}$ hydrocarbyl group, more preferably a $C_1$ to $C_{10}$ hydrocarbyl group;
q is 0, 1 or 2.

In the present invention hydrocarbyl groups are univalent groups formed by removing a hydrogen atom from a hydrocarbon, e.g. ethyl, phenyl.

Special examples of the compound having a silicon-containing group are those wherein
$R^1$ is vinyl, allyl, isopropenyl, butenyl, cyclohexanyl or gamma-(meth)acryloxy propyl;
Y is methoxy, ethoxy, formyloxy, acetoxy, propionyloxy or an alkyl- or arylamino group; and
$R^2$, if present, is a methyl, ethyl, propyl, decyl or phenyl group.

A preferred compound having a silicon-containing group is represented by the formula $$CH_2=CHSi(OA)_3$$

wherein A is a hydrocarbyl group having 1-8 carbon atoms, preferably 1-4 carbon atoms.

The most preferred compounds are vinyl-trimethoxysilane, vinyl-bismethoxyethoxysilane, vinyl-triethoxysilane, gamma-(meth)acryl-oxypropyltrimethoxysilane, gamma (meth)acryloxypropyltriethoxysilane, and vinyl triacetoxysilane.

The copolymerisation of olefin, e.g. ethylene, and the compound having cross-linkable silicon-containing groups may be carried out under any suitable conditions resulting in the copolymerisation of the two monomers. Suitable methods are described in EP1923404

Moreover, the copolymerisation of olefin, e.g. ethylene, and the compound having cross-linkable silicon-containing groups may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl (meth)acrylate, ethyl(meth)acrylate and butyl(meth)acrylate, (d) olefinically unsaturated carboxylic acids, such as (meth)acrylic acid, maleic acid and fumaric acid, (e) (meth) acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)acrylate, are preferred.

The term "(meth)acrylic acid" is intended to embrace both acrylic acid and methacrylic acid.

Especially preferred comonomers are butyl acrylate, ethyl acrylate and methyl acrylate.

Usually not more than two comonomers besides the olefin, e.g. ethylene, and the compound having cross-linkable silicon-containing groups are present in component (C), preferably not more than one comonomer besides the olefin, e.g. ethylene and the compound having cross-linkable silicon-containing groups are present in component (C). In a preferred embodiment no further comonomer besides olefin, e.g. ethylene and the compound having cross-linkable silicon-containing groups are present in component (C).

If present, the content of comonomers different from the compound having cross-linkable silicon-containing groups may amount to 70 wt % of the component (C), preferably about 0.5 to 35 wt %, most preferably about 1 to 30 wt % of component (C).

If using a graft polymer, this may have been produced e.g. by any of the two methods described in U.S. Pat. Nos. 3,646,155 and 4,117,195, respectively.

Component (C) preferably contains 0.001 to 15 wt % of the compound having cross-linkable silicon-containing groups, more preferably 0.01 to 5 wt % of the compound having cross-linkable silicon-containing groups and most preferably 0.1 to 2.5 wt % of the compound having cross-linkable silicon-containing groups.

The present invention is further directed to a cross-linked polyolefin composition obtainable by treating the polyolefin composition according to the invention under cross-linking conditions.

The composition is preferably used in a cable, more preferably for a power cable and most preferably for a power cable for voltages below 1000V with a layer that has a colour in visible light. White is defined as a colour.

The present invention is further directed to the use of the catalyst masterbatch according to the invention for cross-linking a polyolefin composition comprising
a polyolefin having cross-linkable silicon-containing groups (C).

Preferably, the polyolefin composition is further comprising
a pigment.

The present invention is further directed to the use of a polyolefin (B) containing Brønsted acid and/or Brønsted acid anhydride groups together with a silanol condensation catalyst in a polyolefin composition comprising:
a polyolefin with cross-linkable silicon-containing groups (C).

The present invention is further directed to the use of the masterbatch on in a cable layer, preferably a cable insulation layer.

Such an insulation layer usually contains less than 2 wt. % carbon black and is preferably free of carbon black.

The cable is preferably a low voltage cable (<6 kV) or a medium voltage cable (6 to 36 kV), more preferably a low voltage cable.

All documents cited herein are herewith incorporated by reference.

The present invention will be further illustrated by the examples described below.

Methods and Examples

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 21.6 kg ($MFR_{21}$).

Density

Low density polyethylene (LDPE): The density was measured according to ISO 1183-2. The sample preparation was executed according to ISO 1872-2 Table 3 Q (compression moulding).

Low pressure process polyethylene: Density of the polymer was measured according to ISO 1183/1872-2B.

Hot Set Elongation Test

Tape samples as prepared below in experimental part under "Tape sample preparation" were used to determine the hot set properties. Three dumb-bells sample, taken out along extrusion direction were prepared according to ISO527 5A from the 1.8+/−0.1 mm thick crosslinked tape. The hot set tests were made according to EN60811-2-1 (hot set test) by measuring the thermal deformation.

Reference lines, were marked 20 mm apart on the dumb-bells. Each test sample was fixed vertically from upper end thereof in the oven and the load of 0.2 MPa are attached to the lower end of each test sample. After 15 min, 200° C. in oven the distance between the pre-marked lines were measured and the percentage hot set elongation calculated, elongation %. For permanent set %, the tensile force (weight) was removed from the test samples and after recovered in 200° C. for 5 minutes and then let to cool in room temperature to ambient temperature. The permanent set % was calculated from the distance between the marked lines. The average of the three tests were reported.

Content (Mol-%) of Hydrolysable Silane Group(s) Using X-Ray Fluorescence Analysis:

The pellet sample was pressed to a 3 mm thick plaque (150° C. for 2 minutes, under pressure of 5 bar and cooled to room temperature). Si-atom content was analysed by wavelength dispersive XRF (AXS S4 Pioneer Sequential X-ray Spectrometer supplied by Bruker). The pellet sample was pressed to a 3 mm thick plaque (150° C. for 2 minutes, under pressure of 5 bar and cooled to room temperature).

Generally, in XRF-method, the sample is irradiated by electromagnetic waves with wavelengths 0.01-10 nm. The elements present in the sample will then emit fluorescent X-ray radiation with discrete energies that are characteristic for each element. By measuring the intensities of the emitted energies, quantitative analysis can be performed. The quantitative methods are calibrated with compounds with known concentrations of the element of interest e.g. prepared in a Brabender compounder.

The XRF results show the total content (wt %) of Si and are then calculated as wt % of cross-linkable silicon-containing groups, e.g. $R^1SiR^2_qY_{3-q}$.

Content of the Polar and Alpha-Olefin Comonomer

Comonomer content (wt. %) of the polar comonomer was determined in a known manner based on Fourier transform infrared spectroscopy (FTIR) determination calibrated with $^{13}$C-NMR as described in Haslam J, Willis HA, Squirrel DC. Identification and analysis of plastics, $2^{nd}$ ed. London Iliffe books; 1972. FTIR instrument was a Perkin Elmer 2000, 1 scann, resolution 4 $cm^{-1}$. The peak for the used comonomer was compared to the peak of polyethylene as evident for a skilled person (e.g. the peak for butyl acrylate at 3450 $cm^{-1}$ was compared to the peak of polyethylene at 2020 $cm^{-1}$). The wt. % was converted to mol % by calculation, based on the total moles of polymerisable monomers.

An alternative method to determine polar as well as the alpha-olefin comonomer content is to use NMR-method which would give equal results to above X-ray and FTIR method, i.e results would be comparable to purposes of the invention:

The comonomer content was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

EXAMPLES

Components Used

EVS:

ethylene-vinyl-trimethoxy silane-copolymer produced in a high-pressure tubular reaction process, having a VTMS content of 1.35 wt. % an MFR2 (ISO 1133, 190° C., 2.16 kg) of 1.0 g/10 min and a density of 923 kg/m³. Said polymer is commercially available as LE4423 from Borealis AG.

EBA:

ethylene butylacrylate copolymer produced in a high-pressure tubular reaction process, having a butylacrylate content of 17 wt % an MFR2 (ISO 1133, 190° C., 2.16 kg) of 7.0 g/10 min and a density of 924 kg/m³.

ME0420:

maleic anhydride grafted polyethylene with MFR2 (ISO 1133, 190° C., 2.16 kg) of 1.3 g/10 min and a density of 934 kg/m³. Said polymer is commercially available as Borcoat ME0420 from Borealis AG.

Polyone 2000-WT-50:

A white colorant commercial available under trade name Polyone 2000-WT-50, (supplied by PolyOne Sweden AB). It contains pigment and additives that is known to impair the sulphonic acids as condensation catalyst HDTMS hexadecyl trimethoxy silane DDBSA Dodecylbenzenesulphonic acid Stearic acid Palmera B 1800, obtained from Avokal GmbH Silica Perkasil 408 PD, a precipitated silica with a high surface area and a fine particle size. obtained from Grace Davison, W. R. Grace & Co.-Conn.

G3003: maleic anhydride grafted polypropylene obtained from Eastman

Compounding of the Catalyst Masterbatches (Inventive and Reference Examples)

The catalysts masterbatches were compounded using a BUSS AG co-kneader type PR46B-11D/H1 (50 mm screw) with the concentrations shown in table 1 below

|  | RE1 | RE2 | IE3 | IE4 | IE5 | IE6 | IE7 |
|---|---|---|---|---|---|---|---|
| ME0420 |  |  |  | 97 | 44.5 | 93 |  |
| G3003 |  |  | 25.5 |  |  |  | 23.5 |
| EBA wt % | 96.6 | 93 | 70.5 |  | 47.5 |  | 68.5 |

-continued

|  | RE1 | RE2 | IE3 | IE4 | IE5 | IE6 | IE7 |
|---|---|---|---|---|---|---|---|
| DDBSA | 3.4 | 3 | 3 | 3 | 3 | 3 | 3 |
| stearic acid |  | 4 |  |  | 4 | 4 | 4 |
| HDTMS | 1 | 1 | 1 | 1 | 1 | 1 | 1 |
| perkasil 408 pd |  |  | 1 |  | 1 |  | 1 |

RE reference example; IE inventive example

Compounding of the Compositions

Tape samples containing 94 parts per weight of EVS, 5 parts per weight of the respective masterbatch and 1 part by weight of Polyone 2000-WT-50 were prepared by meltmixing in a tape extruder (Collin Teach-Line Extruder, Type: E 20 T SCD 15 having the following settings.

| Set Values Temperature [° C.] | | | | | | Extruder | |
|---|---|---|---|---|---|---|---|
| Zone | | | | | | Speed | Output |
| 1 | 2 | 3 | 4 | 5 | 6 | [rpm] | [kg/h] |
| 60 | 150 | 160 | 170 | 170 | 170 | 30 | 0.8 |

The obtained tape samples (with 1.8+/−0.1 mm in thickness) were used for crosslinking. The crosslinking degree is determined by hot set elongation.

Crosslinking of inventive compositions was effected by keeping the obtained tape sample in ambient conditions, at 23° C. and 50% relative humidity, and let crosslinking to occur for 7 days.

|  | RE1 | RE2 | IE3 | IE4 | IE5 | IE6 | IE7 |
|---|---|---|---|---|---|---|---|
| Elongation 15 min | Break | 160 | 90 | 53 | 62 | 85 | 47 |
| Remaining Elongation |  | 6.9 | 6.3 | 6.5 | 3.5 | 3.3 | 5.3 |

The invention claimed is:

1. A catalyst masterbatch for cross-linking a polyolefin comprising cross-linkable silicon-containing groups comprising
    a Brønsted acid and/or Brønsted acid anhydride (A); and
    a polyolefin (B) containing Brønsted acid anhydride groups,
    wherein the Brønsted acid and/or Brønsted acid anhydride (A) are selected from carboxylic acids, carboxylic acid anhydrides, sulphonic acid and/or sulphonic acid anhydrides;
    wherein (A) is present in an amount of from 0.5 to 20 wt %, and
    wherein (B) is present in an amount of from 15 to 99 wt % based on the total weight of the catalyst masterbatch.

2. The catalyst masterbatch according to claim 1, wherein component (B) is an ethylene homo- or copolymer or propylene homo- or copolymer.

3. The catalyst masterbatch according to claim 1, wherein component (B) contains Brønsted acid anhydride groups in a total amount of 0.01 to 20 wt. % based on the total amount of component (B).

4. The catalyst masterbatch according to claim 1, wherein the catalyst masterbatch contains Brønsted acid groups and/or Brønsted acid anhydride groups in a total amount of 0.2 to 25 wt. % based on the total amount of the catalyst masterbatch.

5. The catalyst masterbatch according to claim 1, wherein the sulphonic acid comprises the structural element (II)
    aromatic organic sulphonic acid comprising the structural element (II)

$$Ar(SO_3H)x \qquad (II)$$

with Ar being an aryl group which may be substituted or non-substituted, and x being at least 1.

6. The catalyst masterbatch according to claim 5, wherein the sulphonic acid is selected from the following compounds:
    (i) an alkylated naphthalene monosulfonic acid substituted with 1 to 4 alkyl groups wherein each alkyl group is a linear or branched alkyl with 5 to 40 carbon atoms with each alkyl group being the same or different and wherein the total number of carbon atoms in the alkyl groups is in the range of 20 to 80 carbon atoms;
    (ii) an arylalkyl sulfonic acid wherein the aryl group is phenyl or naphthyl and is substituted with 1 to 4 alkyl groups wherein each alkyl group is a linear or branched alkyl with 5 to 40 carbon atoms with each alkyl group being the same or different and wherein the total number of carbon atoms in the alkyl groups is in the range of 12 to 80;
    (iii) an alkylated aryl disulfonic acid selected from the group consisting of the structure (III):

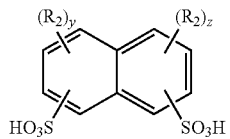

or the structure (IV):

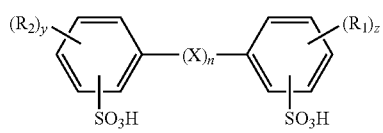

wherein each of $R_1$ and $R_2$ are the same or different and is a linear or branched alkyl group with 6 to 16 carbon atoms, y is 0 to 3, z is 0 to 3 with the proviso that y+z is 1 to 4, n is 0 to 3, X is a divalent moiety selected from the group consisting of
    —C($R_3$)($R_4$)—, wherein each of $R_3$ and $R_4$ is H or independently a linear or branched alkyl group of 1 to 4 carbon atoms and n is 1;
    —C(=O)—, wherein n is 1;
    —S—, wherein n is 1 to 3 and
    —S(O)2—, wherein n is 1.

7. The catalyst masterbatch according to claim 6, wherein the sulphonic acid is selected from compounds of group (ii).

8. The catalyst masterbatch according to claim 7, wherein in the sulphonic acid of group (ii) the aryl group is phenyl and is substituted with 1 to 2 alkyl groups wherein each alkyl group is a linear or branched alkyl with 8 to 25 carbon atoms with each alkyl group being the same or different and wherein the total number of carbon atoms in the alkyl groups is in the range of 12 to 40.

9. The catalyst masterbatch according to claim 5, wherein the sulphonic acid is selected from the following compounds:
   (ii) an arylalkyl sulphonic acid wherein the aryl group is phenyl or naphthyl and is substituted with 1 to 4 alkyl groups wherein each alkyl group is a linear or branched alkyl with 5 to 40 carbon atoms with each alkyl group being the same or different and wherein the total number of carbon atoms in the alkyl groups is in the range of 12 to 80; or
   (iv) an alkylated aryl disulphonic acid selected from the group consisting of the structure (III):

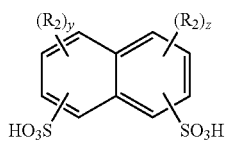

(III)

or the structure (IV):

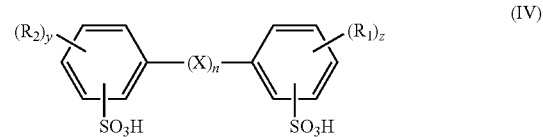

(IV)

wherein each of $R_1$ and $R_2$ are the same or different and is a linear or branched alkyl group with 6 to 16 carbon atoms, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbon atoms and n is 1;

—C(=O)—, wherein n is 1;

—S—, wherein n is 1 to 3 and

—S(O)2—, wherein n is 1.

10. A method for cross-linking a polyolefin with cross-linkable silicon-containing groups (C) comprising adding the masterbatch according to claim 1, to the polyolefin (C) to form a polyolefin composition; and treating the polyolefin composition under cross-linking conditions.

11. A cable layer comprising the catalyst masterbatch according to claim 1.

* * * * *